United States Patent
Wihlm et al.

(10) Patent No.: US 12,415,686 B2
(45) Date of Patent: Sep. 16, 2025

(54) INSTALLATION FOR CONVEYING PRODUCTS AND VIBRATORY SUPPORT DEVICE

(71) Applicant: SIDEL PARTICIPATIONS, Octeville-sur-Mer (FR)

(72) Inventors: Karl Wihlm, Corcelles-les-Citeaux (FR); Thomas Thune, Corcelles-les-Citeaux (FR)

(73) Assignee: Sidel Participations, Octeville-sur-Mer (FR)

( * ) Notice: Subject to any disclaimer, the term of this patent is extended or adjusted under 35 U.S.C. 154(b) by 0 days.

(21) Appl. No.: 18/264,558

(22) PCT Filed: Feb. 22, 2022

(86) PCT No.: PCT/EP2022/054371
§ 371 (c)(1),
(2) Date: Aug. 7, 2023

(87) PCT Pub. No.: WO2022/180023
PCT Pub. Date: Sep. 1, 2022

(65) Prior Publication Data
US 2024/0043225 A1    Feb. 8, 2024

(30) Foreign Application Priority Data
Feb. 25, 2021  (FR) ...................................... 2101823

(51) Int. Cl.
*B65G 47/68* (2006.01)
*B65G 27/16* (2006.01)
*B65G 27/26* (2006.01)

(52) U.S. Cl.
CPC .......... *B65G 47/682* (2013.01); *B65G 27/16* (2013.01); *B65G 27/26* (2013.01)

(58) Field of Classification Search
CPC ....... B65G 47/682; B65G 27/16; B65G 27/26
(Continued)

(56) References Cited

U.S. PATENT DOCUMENTS

| | | | | |
|---|---|---|---|---|
| 6,047,811 A | * | 4/2000 | Zittel | B65G 27/08 198/771 |
| 7,571,800 B2 | * | 8/2009 | Hart | B65G 47/22 198/752.1 |
| 2001/0051538 A1 | * | 12/2001 | Suzuki | A23N 15/00 198/758 |

FOREIGN PATENT DOCUMENTS

| CN | 1681726 A | 10/2005 | | |
|---|---|---|---|---|
| CN | 203975297 U | * 12/2014 | ............. | B65B 37/02 |

(Continued)

OTHER PUBLICATIONS

International Search Report dated Jun. 3, 2022 for PCT/EP2022/054371.

*Primary Examiner* — James R Bidwell
(74) *Attorney, Agent, or Firm* — Blake T. Hudson

(57) ABSTRACT

Provided is a vibratory support device for an installation for conveying products, the device having a fixed chassis and guides mounted on the chassis that are parallel to one another and oriented in a longitudinal direction. The guides are configured as sliding supports for an endless-type belt of a conveying installation and are mounted movably with respect to the chassis with a vibratory movement in a horizontal or substantially horizontal plane. Also provided is an installation for conveying products that is equipped with a vibratory support device for supporting a portion of the length of its conveyor belt.

14 Claims, 4 Drawing Sheets

Figure 1:
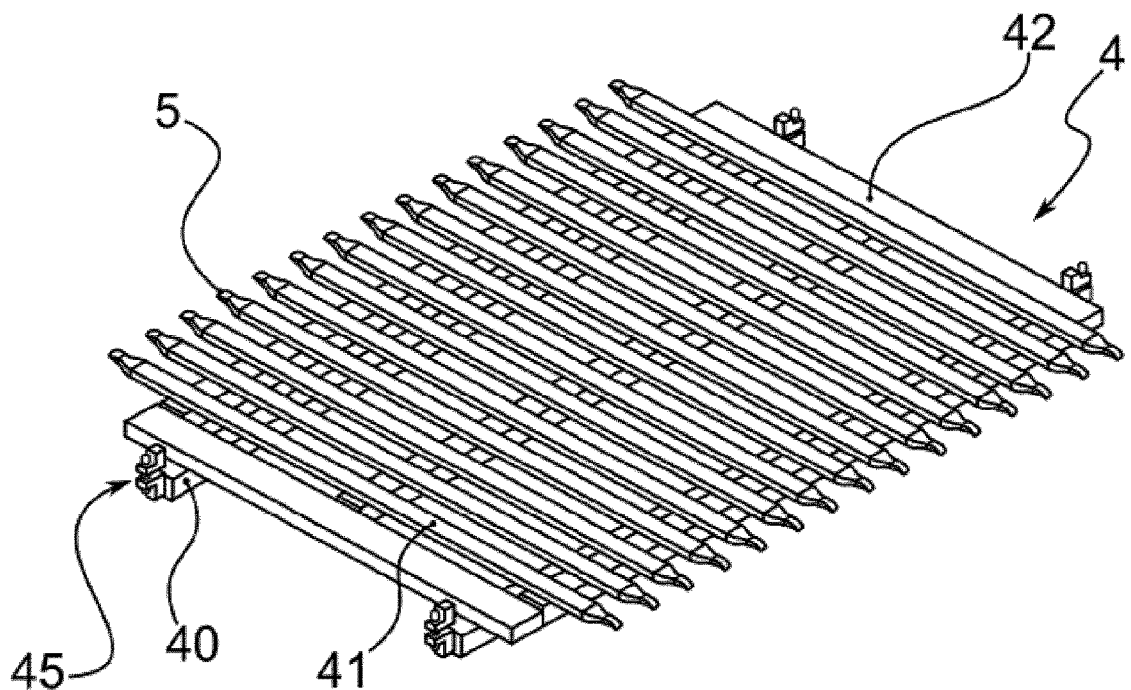

(58) Field of Classification Search
USPC .............................. 198/442, 752.1, 758, 766
See application file for complete search history.

(56) References Cited

FOREIGN PATENT DOCUMENTS

| | | |
|---|---|---|
| CN | 105668122 A | 6/2016 |
| CN | 111038933 A | 4/2020 |

* cited by examiner

INSTALLATION FOR CONVEYING PRODUCTS AND VIBRATORY SUPPORT DEVICE

CROSS-REFERENCE TO RELATED APPLICATIONS

This application is the 35 U.S.C. § 371 national stage of PCT application having serial number PCT/EP2022/054371, filed on 22 Feb. 2022. This application also claims priority to French application having serial number FR2101823 filed on 25 Feb. 2021, each of which are entirely incorporated herein by reference.

The present invention falls within the field of product conveying.

Within the meaning of the present invention, the term "product" encompasses an individual object. One such product is a container, such as a bottle or a flask, or a cardboard box, or even a can. A product can be made of any type of material, notably of plastic material, of metal or even of glass. Depending on its form and its material, a product may be rigid or semi-rigid.

One such container is intended to contain, in a non-exhaustive manner, a fluid, a liquid, powders or granules, notably of agrifood or cosmetic type.

Furthermore, a product can have any type of form, symmetrical or not, regular or irregular. Furthermore, a product can have a rounded section, overall of circular or ovoid form, or else a polygonal section, notably rectangular or square. In particular, such a container comprises a bottom that can be flat or substantially flat, or else, conversely, having one or more cavities, as is the case for example of a can with a concave bottom or of a bottle with a "petal-form" bottom.

As is known, in an industrial line, the products can receive several different successive treatments, such as fabrication of the container, for example in a plastic injection molding or stretch-blow molding operation in the case of a bottle made of plastic material, followed by filling then closure by a stopper and labeling. At the end of these treatments, the products are said to be "finished". For their handling, such finished products undergo a batch packaging. Furthermore, each batch comprises a group of several products, assembled together according to a matrix disposition, generally of overall parallelepipedal form, often square or rectangular, in columns and rows. As an example, a standard batch combines six products in two rows and three columns.

Once the groups of products have been produced, each group can be packaged by wrapping or crating.

The wrapping consists in surrounding or covering the group of products with a sheet or a film, in order to keep the products together and facilitate the handling of such a duly obtained batch. Such wrapping can be performed through a step of stretch-wrapping or preferentially of film wrapping, or else by wrapping by means of a sheet, notably of paper or cardboard material.

During these different steps, the products are transported along the production line, in a direction of displacement extending longitudinally, from upstream to downstream, between and within the various stations dedicated to each treatment that the products have to undergo. Such transport can take place through at least one conveying installation.

The invention specifically targets the conveying of products, alone, namely meaning that the products are not grouped together or wrapped in batches.

Further, the conveying is performed by displacement of the products resting directly by their bottom on the top face of one or more conveyors. This top face is movable, forming a mat, generally in the form of one or more endless belts wound around at least one motorized winding. Furthermore, each endless belt is obtained by fixing of its ends along a joining line, extending transversely with respect to said direction of displacement.

In particular, there are essentially three types of belt, namely:
- a smooth-surface belt, having a product transit function that is horizontal, even slightly inclined by a small slope not exceeding 3% beyond which the products would risk sliding on said smooth surface;
- a belt in the form of a rubberized mat, the material of which has a character that grips products, in order to transit the products over greater slopes and also produce pitches between the packs by acting simply on the speeds between the conveyors;
- a belt provided with freely rotating rollers, dedicated to accumulating products which come to be attached to one another.

Furthermore, the belts of a conveyor are supported longitudinally by slides, on which rests the bottom face of said belts. These slides therefore make it possible to hold the mat over the length of the conveyor, ensuring a perfect flatness of the movable surface to avoid any imbalance and risk of transported products being dropped.

Further, such slides are fixedly mounted on the support structure of the conveyor, extending parallel to one another in said longitudinal direction. These slides are positioned with a transverse gap between one another, according to a width dependent notably on the type of belt supported but also on the format and on the quantity of products to be transported.

That being the case, along a production line, the products can be transported loose, namely the products are positioned staggered and in a disorderly manner, notably one against the other, over all or part of the width of a conveyor. In order for a specific treatment of the products, like packaging, it is necessary to order the loose flow of products according to a number of lines, notably in order to ensure, downstream, that they are grouped together then wrapped in batches from such a multiline flow of products.

Such an operation is performed via product alignment means, globally taking the form of a funnel positioned above the conveyor, making it possible to receive as input the loose flow of said products and align them in several mutually parallel lines delivered at the output. Further, such alignment means comprise vertical sheets mounted on a chassis and spaced apart so as to form corridors. Furthermore, the corridors are provided to converge from upstream to downstream, becoming tighter in the direction of displacement of the products.

Thus, at the input, the flow of loose products is separated on contact with the upstream end of each of the sheets, the products being pushed laterally on either side to enter into each corridor. As they advance, the convergence in each corridor forms a bottleneck, forcing the bottles to be positioned one behind the other, notably by friction on contact with the walls of the sheets and by rolling between the bottles as they advance along each corridor.

In particular, the decreasing corridor width is configured as a function of the number of products to be received as input, to be channeled to obtain an output flow with lines that are one or more products wide, as well as the format of said products, notably their diameter.

One drawback with such a funnel-type aligner lies in the recurrent blocking of the products at the input and inside the corridors. Indeed, the conveying speed, aggregated with the narrowing of the width of the corridors, often causes two products to be positioned at the front which causes them to be jammed, notably because of the friction of the products between them and against the walls of the sheets. It is then necessary to stop the conveying, in order to unblock the products, notably by the manual intervention of an operator: an operation that is tedious and precarious to reach the products to be unblocked.

A similar treatment consists in placing a flow of products in corridors, via sheets that are parallel to one another and oriented longitudinally. The products conveyed are separated transversely by said sheets, forming distinct corridors.

Such an operation presents the same drawbacks as for a funnel-type aligner, namely that the products can be placed at the front and be jammed between the sheets, in particular at the input of a corridor.

To mitigate this drawback, the imposition of a vibration on the sheets has been imagined, making it possible to reduce the friction coefficient of the products with said sheets, in order to limit the risks of jamming of the products in the corridors. Currently, there is therefore an aligner provided with a vibratory motorization that is transmitted to the sheets via a suitable chassis.

Furthermore, such a vibratory aligner necessitates isolation with respect to the rest of the machine, in order to limit the transmission of the vibrations generated to other components. Such vibratory isolation is obtained by mounting the chassis on an elastic suspension.

However, because of its configuration in elevation and mounted on the conveyor, the absorption of the vibrations is performed to the detriment of the transmission of said vibrations to the sheets. Furthermore, the sheets vibrate on contact with the products that they have to displace lightly on the conveyor, inducing consequential power and suitable motorization. Furthermore, the greater the size of the products the more necessary it is to increase the power of the motorization, the torque of which imposes all the more strain on the support structure.

In addition, a portion of the vibrations cannot be attenuated and is transmitted to the other components, affecting their operation and their lifetime. The result thereof is mechanical fatigue of the elements of such a vibratory aligner, going as far as provoking a break, notably at the welds between the sheets and the chassis.

Moreover, in the context of management by an installation of several product formats, it is necessary to set the spacing of the corridors as a function of the format to be treated. Such setting is performed manually but is preferably automated, in order to reduce the downtime needed when changing format and to ensure a more precise setting.

However, the components used for such automatic setting do not offer sufficient resistance to the vibrations that are imposed, leading to misadjustments of the machine during production, once again a premature deterioration of said components, even the breaking thereof.

The aim of the invention is to mitigate the drawbacks of the state of the art by proposing a supporting vibratory device ensuring a direct transmission of the vibrations to the products, from below. To do this, the invention provides guides configured to serve as sliding support for a conveying belt, said support guides being provided to be movable with respect to the chassis of the vibratory device, in order to transmit to these support guides vibrations induced by an embedded motorization.

According to the invention, said vibratory support device for an installation for conveying products, comprises:

a fixed chassis;
guides mounted on said chassis that are parallel to one another and oriented in a longitudinal direction, said guides being configured as sliding supports of an endless-type belt of a conveying installation.

Said vibratory support device is characterized in that:
said guides are mounted to be movable with respect to said chassis by a vibratory movement in a horizontal or essentially horizontal plane.

According to additional, nonlimiting, features, such a vibratory conveying device can comprise:
a movable frame receiving, exceptionally by fixing, said guides and linked to said chassis via at least one articulation;
at least one actuator of said frame by said vibratory movement.

According to an embodiment, said at least one actuator can be embedded on said frame.

According to an embodiment, said at least one articulation can be elastic, forming means for absorbing said vibratory movement between said frame and said chassis.

According to an embodiment, said vibratory device can comprise at least one end upstream of each of said guides comprising a chamfered, preferentially dished, top face.

According to an embodiment, said vibratory device can comprise at least one end upstream of each of said guides with lateral edges that diverge from the outside to the inside of said guide.

Furthermore, the vibratory device provides a support chassis which ensures an improved transmission of the vibrations generated, limiting the loss thereof to the rest of the support structure, notably when it is located in a conveying installation.

To this end, the invention relates also to a product conveying installation equipped with such a vibratory conveying device.

Advantageously, such a conveying installation comprises a support structure;
slides fixedly mounted on said support structure parallel to one another and oriented in the longitudinal direction;
said slides being separated transversely by a gap;
at least one endless-type conveying belt, said belt being supported by the surface of said slides along at least a portion of the length of the conveying installation;
a motorization of said conveying belt in said longitudinal direction from upstream to downstream.

Said installation is characterized in that it comprises along another contiguous portion, a vibratory conveying device comprising:
a fixed chassis mounted on said support structure;
guides mounted on a frame that are parallel to one another and oriented in a longitudinal direction, said guides extending in continuity with said slides, acting as supports of said conveying belt;
said guides being mounted to be movable with respect to said chassis via said frame provided to be movable with respect to said chassis by a vibratory movement in a horizontal or essentially horizontal plane.

According to additional, nonlimiting features, the upstream and/or downstream ends of said guides can be positioned interlocking respectively with the downstream and/or upstream ends of said slides, inside said gaps between the slides.

According to an embodiment, said conveying installation can comprise:

at least one joining plate flush between the slides and the guides;

the upstream and/or downstream ends of said guides being positioned interlocking in corresponding recesses of said plate.

According to an embodiment, said interlocking can comprise a transverse play ensuring the free vibratory movement of the guides in said horizontal or substantially horizontal plane.

According to an embodiment, said vibratory device can comprise at least one actuator of said frame by said vibratory movement.

According to an embodiment, said vibratory device can comprise at least one elastic articulation, forming means for absorbing said vibratory movement between said frame and said chassis.

According to an embodiment, said at least one actuator can be motorized embedded on said frame, or else by said motorization via a transmission.

According to an embodiment, said vibratory device can comprise means for setting the height between the chassis and said frame.

According to an embodiment, said conveying installation can comprise, above said belt, an aligner of the products, said aligner extending at least along said other portion.

Thus, it is possible to adapt the conveying installation by introducing the vibratory device at a dedicated location along the conveying surface, so as to transmit its vibration via the belt which is supported by the support guides, and do so only at said location. In particular, the latter corresponds to the positioning in the upper part of a convergent aligner, of funnel type, or else means for arranging in corridors: the vibrations then transmitted by the vibratory device limit the blocking of the products as they pass through the corridors of such a convergent aligner.

Figure 2:
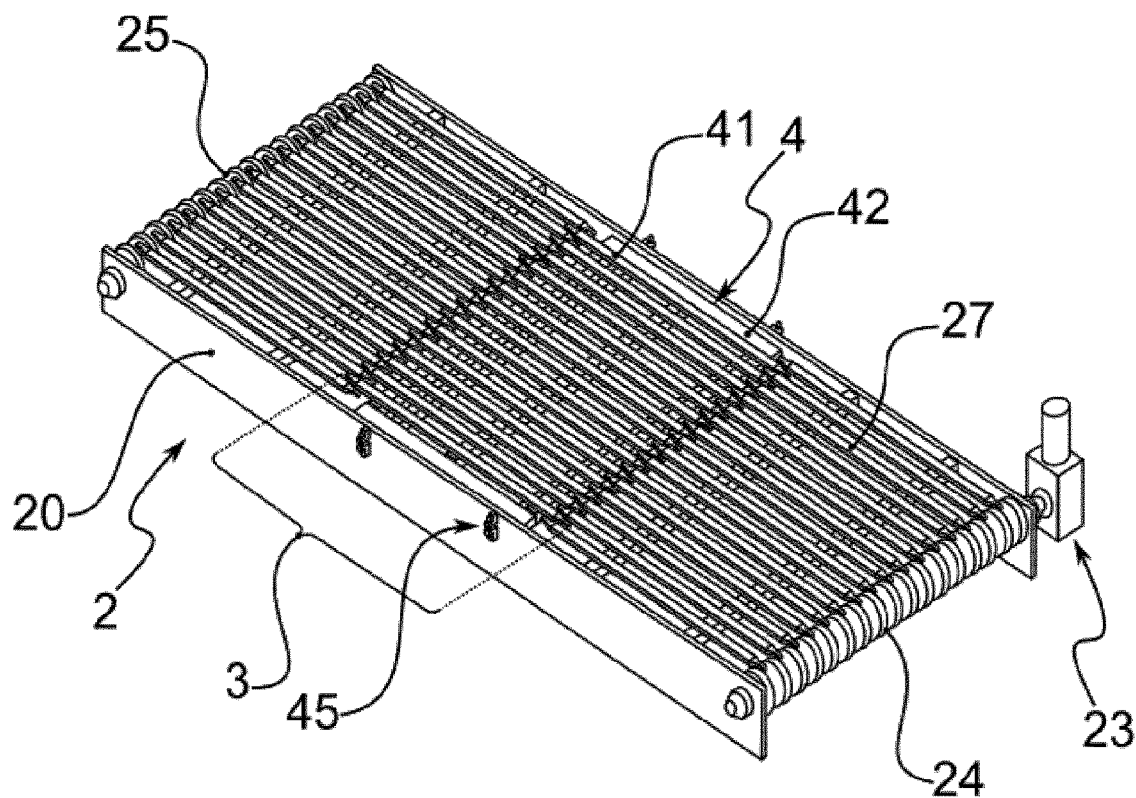
Figure 3:
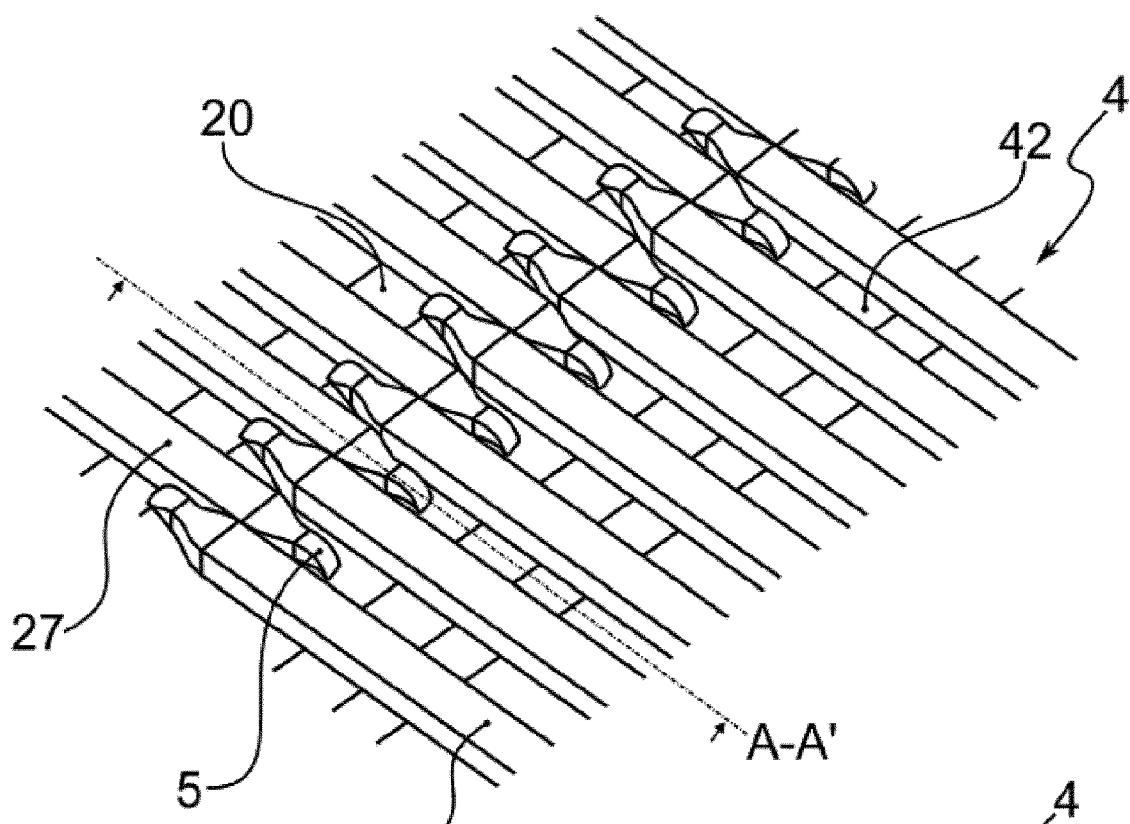
Figure 4:
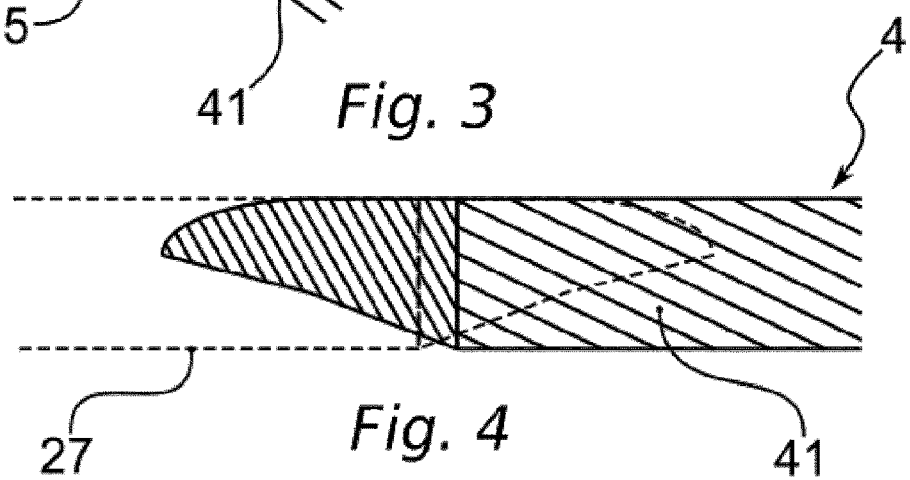
Figure 5:
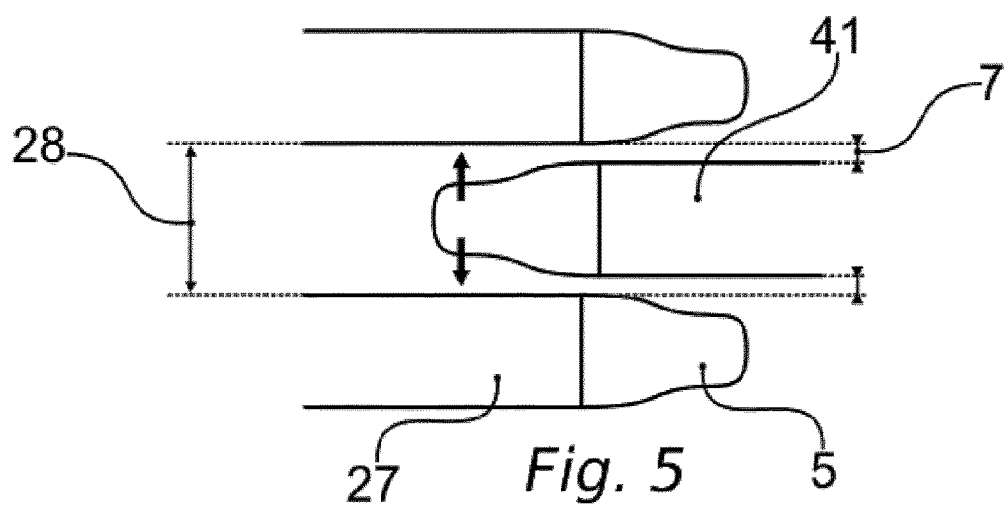
Figure 6:
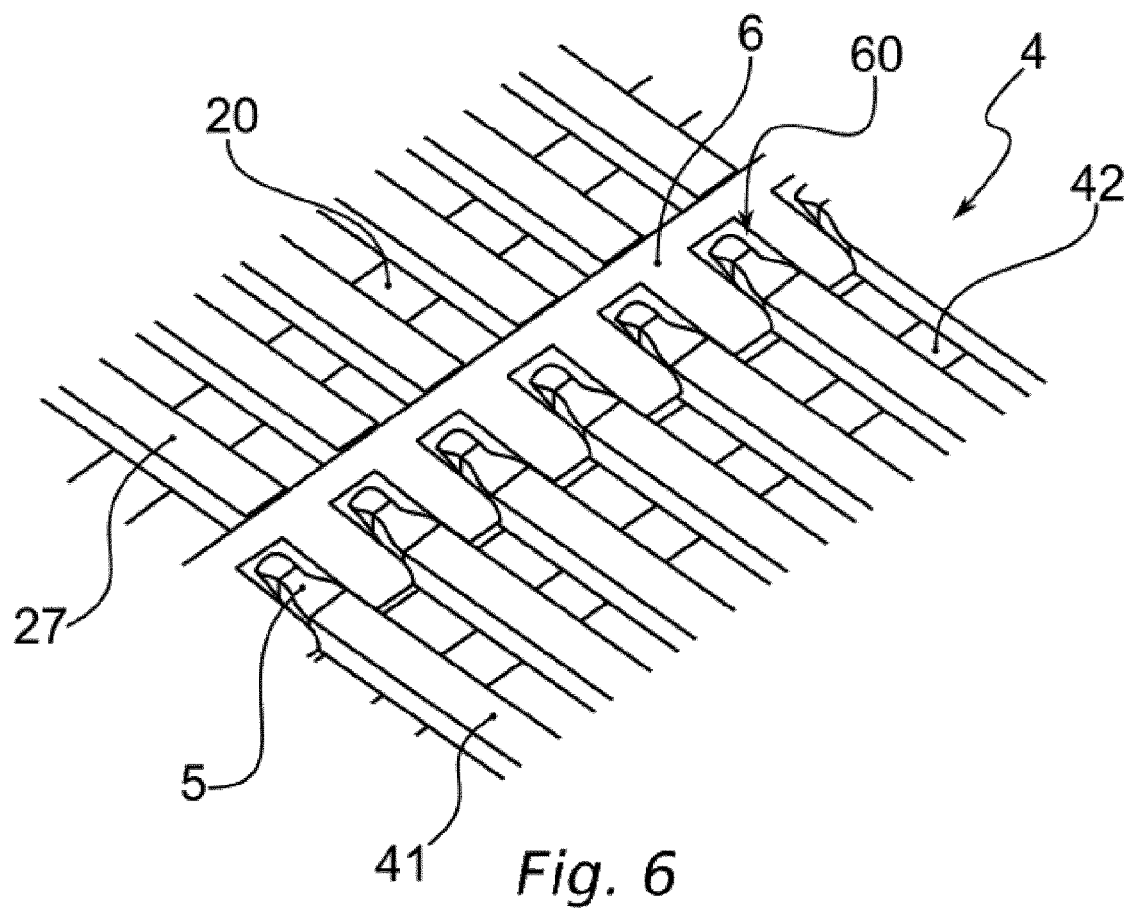
Figure 7:
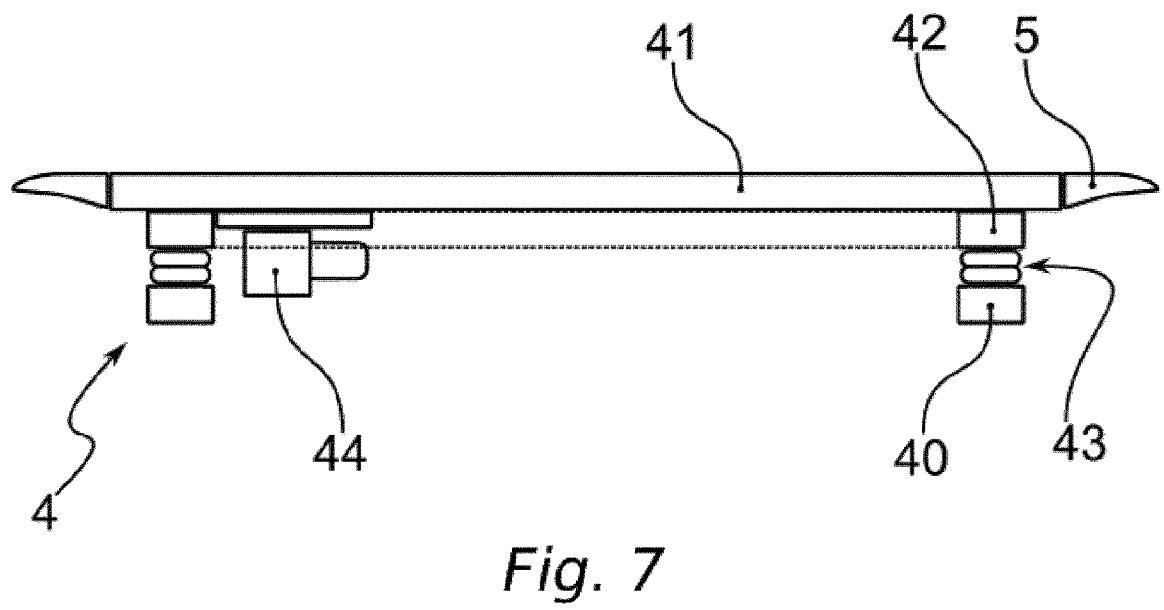
Figure 8:
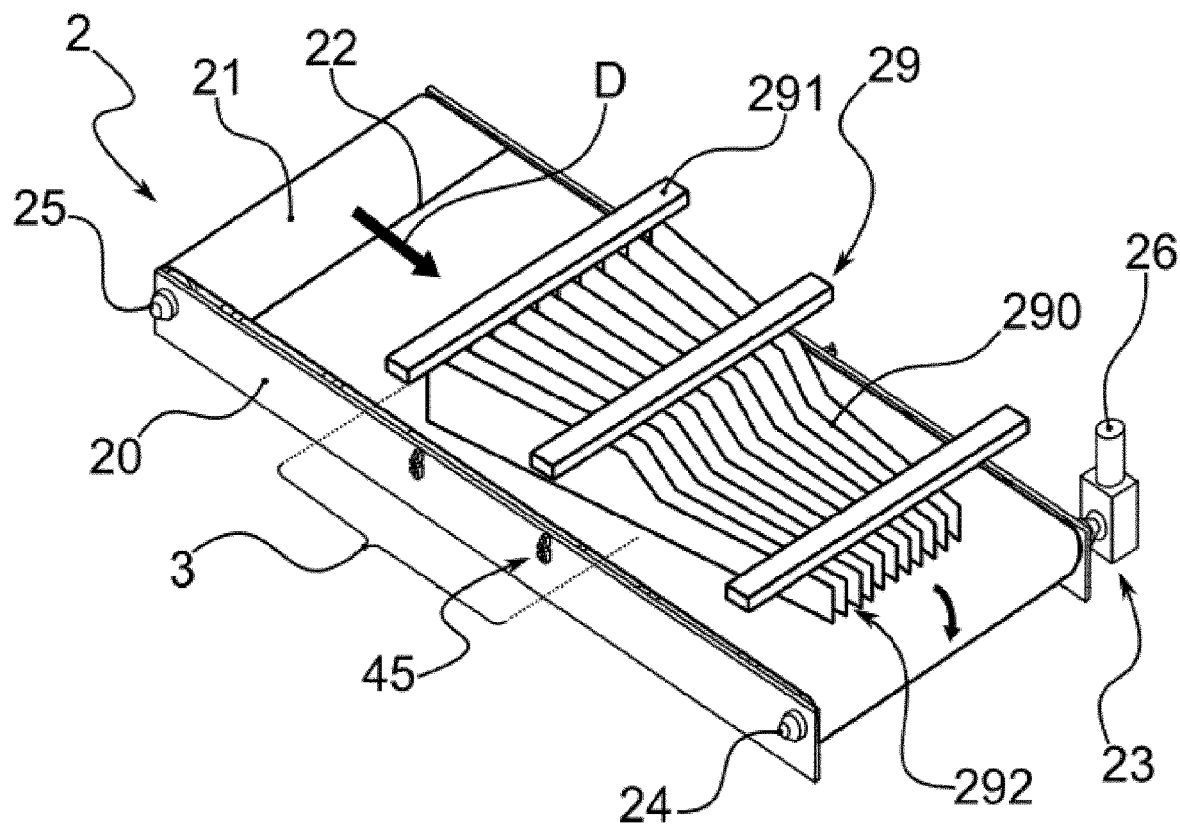
Figure 9:
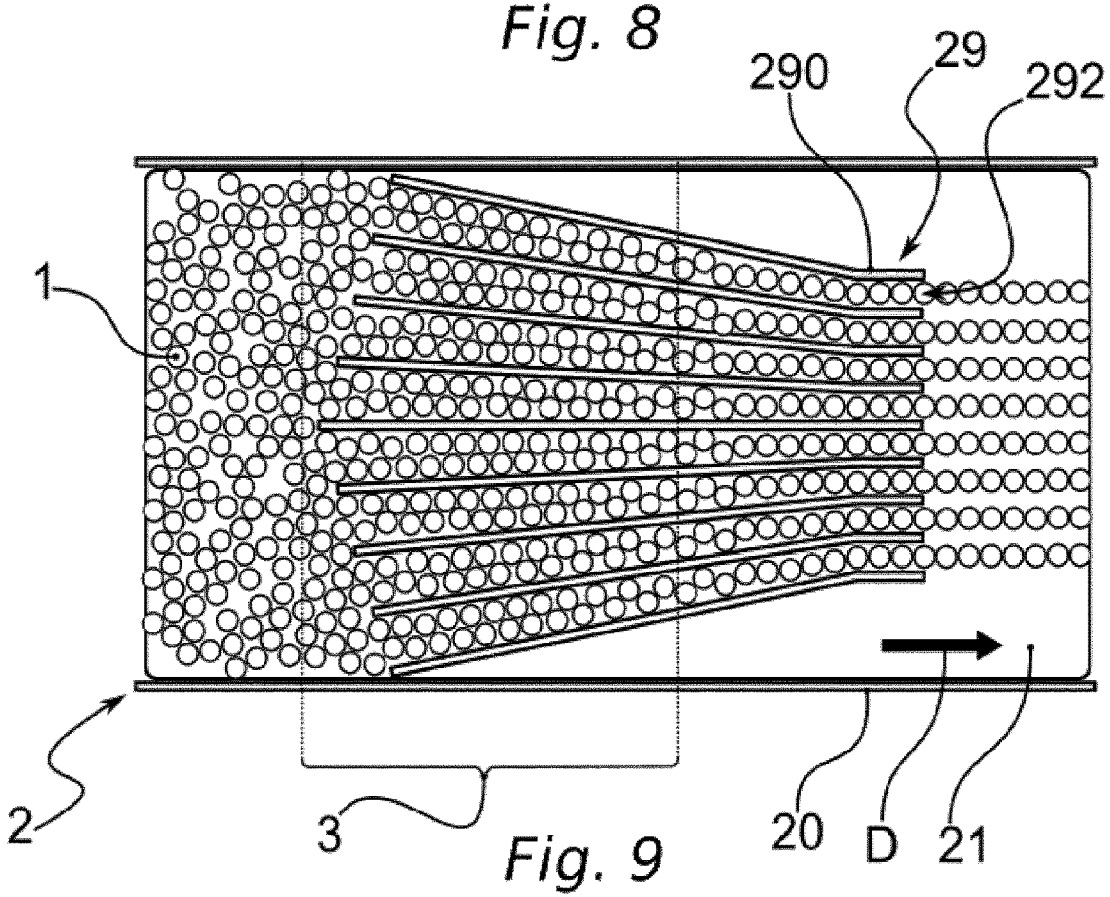

Other features and advantages of the invention will emerge from the following detailed description of the non-limiting embodiments of the invention, with reference to the attached figures, in which:

FIG. 1 schematically represents a perspective elevation view of a conveying vibratory device according to an embodiment, showing notably parallel support guides whose ends are provided with dished members;

FIG. 2 schematically represents a perspective elevation view of a conveying installation according to an embodiment, without any mat, notably showing the location of a vibratory device along a central portion;

FIG. 3 schematically represents a perspective elevation view of a detail of FIG. 2, showing notably the interlocking between the vibratory device and the conveying installation;

FIG. 4 schematically represents a vertical cross-sectional view along the axis A-A' of a detail of FIG. 2;

FIG. 5 schematically represents an elevation view of a detail of FIG. 2, showing notably a play necessary to a transverse vibratory movement between the respective ends of the movable supports and of the slides;

FIG. 6 schematically represents an elevation view according to another embodiment, notably showing a crenelated plate ensuring the joining of the conveying installation with an upstream end of the vibratory device; and FIG. 7 schematically represents a side view of a vibratory device according to an embodiment, notably showing an embedded motorization and the elastic articulations between the frame and the chassis;

FIG. 8 schematically represents a perspective view of a conveying installation equipped with a convergent aligner, notably revealing the vibrations transmitted to the products conveyed via the mat passing over a vibratory device; and FIG. 9 schematically represents a simplified elevation view of a conveying installation equipped with an aligner, notably showing the lining-up of the products in the corridors of said aligner.

The present invention falls within the field of the conveying of products 1.

Within the meaning of the present invention, the term "product" encompasses an individual object. Such a product 1 is a container, such as a bottle or a flask, or a cardboard box or even a can. A product 1 can be made of any type of material, notably of plastic material, of metal or even of glass. Depending on its form and its material, a product 1 may be rigid or semi-rigid.

Such a product 1 in the form of a container is intended to contain, in a non-exhaustive manner, a fluid, a liquid, powders or granules, notably of agrifood or cosmetic type.

Furthermore, a product 1 can take any type of form, symmetrical or not, regular or irregular. Furthermore, a product 1 can have a rounded, overall circular or ovoid section, or else a polygonal section, notably rectangular or square.

In particular, such a product 1 comprises a bottom that can be flat or substantially flat, or else, conversely, having one or more cavities, as is the case for example of a can with a concave bottom or a bottle with a so-called "petal-form" bottom.

As described previously, in an industrial line, the products 1 can receive several successive treatments. During these various steps, the products 1 are transports along the production line, between and within the various stations dedicated to each treatment that the products 1 have to undergo.

In the context of the present invention, the transporting of the products 1 is performed in a direction D of displacement extending longitudinally or essentially longitudinally, in a direction extending from upstream to downstream. Such a direction D of displacement is notably represented in FIGS. 8 and 9, in the form of an arrow oriented from left to right.

The displacement of the products 1 is therefore performed longitudinally. Furthermore, said displacement is performed globally on a horizontal or substantially horizontal plane, notably along a conveying surface. Furthermore, the term "transverse" is understood to be a direction orthogonal or substantially orthogonal with respect to said longitudinal direction D, substantially on the same horizontal plane.

That being the case, the transportation is performed through at least one installation 2 for conveying products 1, hereinafter "installation 2". Such a conveying installation 2 is like a conveyor. Several installations 2 can be arranged end to end with one another, depending on the conveying of the products 1 to be performed along the industrial production line.

Furthermore, the products 1 rest by their bottom on the top face of such an installation 2. This top face is set in motion, ensuring the longitudinal displacement of the products 1.

The invention relates to such an installation 2 for conveying products 1 in a longitudinal direction D.

Said installation 2 first of all comprises a support structure 20. This support structure 20 is located on the ground and supports the various components of the installation 2. To this end, it can comprise elements linked and fixed to one another, to which said components can be added.

To this end, the installation 2 also comprises at least one conveying belt 21, preferably a single belt, but potentially several belts 21 juxtaposed transversely, so as to form the movable conveying surface, notably a conveying mat or bed. The belt or belts 21 are hereinafter called "belt 21".

According to different embodiments, the belt 21 can be of different types, namely notably:
- a belt 21 with the smooth surface, having a transit function for the products 1 that is horizontal, even slightly inclined by a small slope not exceeding 3%, beyond which the products 1 would risk slipping on said smooth surface;
- a belt 21 in the form of a rubberized mat, the material of which exhibits a product 1 gripping character, in order to transit the products 1 over greater slopes;
- a belt 21 provided with freely rotating rollers, dedicated to building up products 1 which come to be attached to one another.

This belt 21 is of endless type. The belt 21 can comprise one or more abutting sections, namely so that their ends are linked at at least one joining line 22, so as to form a closed loop. This belt 21 forms the movable surface which ensures the displacement of the products 1 in the direction D of displacement, from upstream to downstream of the installation 2. In other words, the belt 21 displaces the products 1 from the input to the output of the installation 2.

To do this, the installation 2 comprises a motorization 23 of said belt 21 in said direction D of displacement.

According to a preferential embodiment, the motorization 23 can comprise at least one drive roller 24 and at least one return roller 25. These rollers 24, 25 are situated at the upstream and downstream ends of the installation 2, added in rotation to the support structure 20. Furthermore, the belt 21 is positioned to roll around the rollers 24, 25.

Furthermore, the rollers 24, 25 are configured to ensure that the belt 21 is set in motion, notably by friction and the powering up of said belt 21, or else via a rack gear meshing.

Furthermore, the motorization 23 comprises a suitable motor 26, of any type but preferentially asynchronous, ensuring the driving of the roller 24.

According to the embodiment represented in FIG. 8, the drive roller 24 is situated at the downstream end, while the return roller 25 is positioned at the upstream end. The reverse is possible, even a drive roller 24 situated along the installation 2, between two return rollers 25 situated at the upstream and downstream ends.

Further, in order to ensure the bearing capacity of the belt 21 along the installation 2, said installation 2 comprises slides 27. These slides 27 are fixedly mounted on said support structure 20. Said slides 27 extend parallel to one another and are oriented in the longitudinal direction D. Furthermore, said slides 27 are separated transversely by a gap 28. The width of this gap 28 is determined as a function of the width and the number of the slides 27, as well as the products 1 to be transported, notably the quantity of products 1 and the weight of this quantity. Such a gap 28 is revealed in FIG. 5.

Indeed, the belt 21 is supported by the surface of said slides 27 along at least a portion of the length of the installation 2. In sum, the bottom face of the belt 21 comes to bear on the top faces of the slides 27, being displaced by slipping along these top faces. In other words, the slides 27 hold the belt 21 from below in its displacement.

Furthermore, said at least one portion of the length of the installation 2 corresponds to one or more zones extending longitudinally between the upstream and downstream ends of the installation 2. The slides 27 are fixed and extend along these zones. The ends of the slides 27 can extend beyond their respective zone, notably at the rollers 24, 25, but also at another portion 3.

To this end, the other portion 3 is contiguous to said at least one portion. According to the preferential embodiment, notably visible in FIGS. 2 and 8, the other portion 3 is bracketed by two other portions situated upstream and downstream. According to another embodiment, the other portion 3 can be situated at an upstream or downstream end of the installation 2.

According to an embodiment, as visible notably in FIGS. 8 and 9, the installation 2 comprises, above said belt 21, an aligner 29 of the products 1. In particular, said aligner 29 extends at least along said other portion 3.

Such an aligner 29 makes it possible to change the alignment of the flow of products 1 between the upstream and downstream. Furthermore, the products 1 can be transported loose, namely the products 1 are positioned staggered and in a disordered manner, notably against one another, over all or part of the width of the installation 2 upstream of the aligner 29. For a specific treatment of the products 1, like the packaging, it is necessary to order the loose flow of products 1 according to several lines, notably to ensure, downstream, that they are grouped together then wrapped in batches from such a multiple line flow of products 1. The aligner 29 therefore allows this operation of transformation of a loose flow of products 1 to a multiple-line flow.

To do this, the aligner 29 comprises means for aligning the products 1, overall taking the form of a funnel positioned above the installation 2. This funnel makes it possible to receive as input the loose flow of said products 1 and align them according to several mutually parallel lines, delivered at the output. Further, such an alignment means comprises vertical sheets 290 mounted on a reinforcement 291 and spaced apart so as to form corridors 292. Furthermore, the corridors 292 are provided to converge from the upstream to the downstream, becoming tighter in the direction D of displacement of the products 1 along the installation 2.

Thus, at the input, the flow of loose products 1 is separated on contact with the downstream end of each of the sheets 290, the products 1 being moved aside laterally on either side to enter into each corridor 292. As they advance, the convergence in each corridor 292 forms a bottleneck, forcing the products 1 to be positioned one behind the other, notably by friction on contact with the walls of the sheets 290 and by rolling between the products 1 as they advance along each corridor 292.

In particular, the decreasing width of the corridors 292 is configured according to the number of products 1 to be received as input, and the format of said products 1, notably their diameter.

This operation of alignment of the products 1 performed by the aligner 29 is notably visible in FIG. 9.

Advantageously, the invention provides for vibrations to be transmitted to the products 1 transported by the installation 2. Such vibrations make it possible to ensure different functions, depending on the treatment applied to the products 1, such as, for example, a transformation by an aligner 29 of a loose flow to a multiple-line flow, or else the pitching thereof by a suitable means, notably a worm screw, or even a means for grouping together several products 1 in batches. These vibrations can also be applied according to the content of the products 1, notably to maintain a suspension or a mixture inside the products 1. These vibrations can also serve to dissociate the products 1 from one another, notably to limit the adhesion between them, namely unstick them from one another.

Preferentially, the vibrations transmitted in an alignment prevent two products 1 from becoming blocked together and jamming between the sheets 290 of a corridor.

Advantageously, the installation 2 comprises, along said other portion 3, contiguous to at least one portion, a conveying vibratory device 4, hereinafter called "vibratory device 4" or "device 4". This device 4 therefore ensures that the products 1 are made to vibrate over a part of the length of the installation 2, in particular along the other portion 3, which can then receive an aligner 29 over all or part of the length of this other portion 3.

The invention relates also to such a vibratory device 4.

Further, said vibratory device 4 comprises a chassis 40. This chassis 40 is provided to be fixed, namely so that it is configured and intended to be made subject and secured to the support structure 20.

The device 4 also comprises guides 41 mounted on said chassis 40. These guides 41 are disposed parallel to one another and are oriented in a longitudinal direction, namely said direction D of displacement of the products 1.

In addition, said guides 41 are configured as sliding supports of the belt 21 of endless type of the installation 2. In sum, the guides 41 serve the same purpose as the slides 27, supporting the slip of the belt 21 from below when it is displaced along the other portion 3.

Advantageously, said guides 41 are mounted to be movable with respect to said chassis 40 by a vibratory movement in a horizontal or essentially horizontal plane.

Within the meaning of the invention, said vibratory movement is a mechanical oscillation movement about a position of stable equilibrium or along a mean trajectory. This vibratory movement is performed according to several degrees of freedom, notably according to at least one degree of freedom in a translation oriented transversely with respect to the direction D of displacement. Said vibratory movement can be periodic, with a frequency and/or an amplitude that are designed to be adjustable.

Furthermore, the vibratory movement can be generated by suitable means, preferentially mechanical, for example by an off-center motor or with a remote link, or else by a cam link system. Moreover, the horizontal or substantially horizontal plane corresponds to the positions of the guides 41 in their displacements, whether they be horizontal or vary a little vertically as a function of the vibratory movement transmitted. Indeed, to conserve the bearing capacity but also the flatness of the conveying surface, namely of the belt 21, the guides 41 are positioned flush with the slides 27, thus ensuring a continuity of flatness between the portions and the other portion 3 of the installation 2. Consequently, said guides 41 extend in continuity with said slides 27, acting as supports for said conveying belt 21.

According to an embodiment, each of the guides 41 is provided to be movable independently of the others.

According to another preferential embodiment, the vibratory device 4 comprises a movable frame 42 receiving, exceptionally by fixing, said guides 41. In sum, the frame 42 is secured to all the guides 41 and moves with respect to the fixed chassis 40, ensuring the transmission of the vibratory movement to all the guides 41 simultaneously or in a synchronized manner.

Furthermore, this frame 42 is linked to said chassis 40 via at least one articulation 43. This articulation ensures at least that the frame 42 is held with respect to the chassis 40, and that it is movable with respect to said chassis 40.

To this end, the vibratory device 4 also comprises at least one actuator 44 of said frame 42. This actuator ensures the movability of the frame 42, in particular by generating or by performing the transmission of said vibratory movement.

According to an embodiment, said actuator 44 is embedded on said frame 42. The actuator 44 is then independent and generates the vibratory movement directly transmitted to the guides 41 via said frame 42. Such an embedded actuator 44 is notably visible in FIG. 7. Furthermore, it can be controlled in operation or not, making it possible to configure the installation 2 by setting the other portion 3 in vibratory motion or by stopping these vibrations.

According to another embodiment, said actuator 44 can be motorized by said motorization 23 via a transmission. According to the configuration, the motorization 23, the transmission and/or the actuator 44 can generate the vibratory nature of the movement, via suitable and dedicated means, as explained previously.

As explained previously, the articulation 43 ensures the movable link between the frame 42 and the chassis 40. For this, the articulation 43 can be of any type, namely and in a nonlimiting manner: an occasional link, notably sphere/flat, or a rectilinear linear link, notably cylinder/flat, or else by an annular linear link, notably sphere/cylinder, or even a ball joint or spherical link, notably sphere/sphere. The articulation 43 can also comprise a combination of the abovementioned links. Preferentially, the articulation 43 is elastic, forming means for absorbing said vibratory movement between said frame 42 and said chassis 40. Such an elastic link can be of any type, as mentioned above. Preferentially, the elastic articulation 43 can comprise a suitable member, notably in the form of a suspension cylinder or of a spring, or even of a member provided with a material with elastic characteristics, for example rubber.

According to an embodiment, the installation 2 comprises means 45 for adjusting the height between the chassis 40 and said frame 42. These adjustment means 45 can be embedded on said device 4 and added to the support structure 20 during the fixing of the chassis 40. The adjustment means 45 make it possible to refine, manually or automatically, the height difference between the guides 41 and the slides 27, to ensure the flatness of the belt 21.

Furthermore, this adjustment makes it possible to compensate for any aging of the articulation 43, quite particularly a loss of resilience of its elastic material, ensuring that the flatness of the belt 21 is maintained between the portions and the other portion 3. To this end, according to an embodiment, at least one upstream end of each of said guides 41 comprises a chamfered top face, preferentially dished. Preferably, all the upstream and downstream ends of each of the guides 41 is provided with a slope. This slope increases at the upstream ends and decreases at the downstream ends, in the direction D of displacement. It makes it possible to ensure that the bottom face of the belt 21, notably at its joining line 22, does not hook the upstream end of the guides 41 in its passes.

According to an embodiment, the upstream and/or downstream ends of the slides 27 have the same chamfered configuration.

This chamfered configuration is notably visible in FIG. 4.

Such a chamfered configuration can be obtained by shaping the guides 41 and/or the slides 27, or else by the addition of a corresponding end piece 5.

According to another embodiment, at least one upstream end of each of said guides 41 comprises lateral edges that diverge from the outside to the inside of said guide 41. Preferably, all the upstream and downstream ends of each of the guides 41 is pointed.

According to an embodiment, the upstream and/or downstream ends of the slides 27 have the same pointed configuration.

This pointed configuration is notably visible in FIG. 5.

Such a pointed configuration can be obtained by shaping the guides 41 and/or the slides 27, or else by the addition of a corresponding end piece 5.

According to different configurations, the installation 2 can provide an interlocking between the slides 27 of the portions and the guides 41 of the other portion 3, to ensure the continuity of the bearing capacity of the belt 21.

According to an embodiment, as notably visible in FIG. 3, the upstream and/or downstream ends of said guides 41 are positioned interlocking respectively with the downstream and/or upstream ends of said slides 27, inside said gaps 28 between the slides 27.

According to an alterative embodiment, as notably visible in FIG. 6, the installation 2 comprises at least one joining plate 6 flush between the slides 27 and the guides 41. Furthermore, the upstream and/or downstream ends of said guides 41 are positioned interlocking in corresponding recesses 60 of said plate 6. In sum, the plate 6 has a crenelated form.

Such a plate 6 can be added by fixing to the support structure 20 or to the corresponding ends of the slides 27. This fixing of the plate 6 is performed flush with the top face of the slides 27. The plate 6 therefore replaces the chamfered and/or pointed ends of the slides 27.

According to another embodiment, the plate 6 can comprise recesses 60 along each of its transverse edges, so as to receive, on one side, the ends of the slides 27 and, on the opposite side, the ends of the guides 41. Such a plate 6 with dual crenelation is then added by fixing to the support structure 20.

Said plate 6 therefore corresponds to a fixed sliding surface. It can be composed of any type of material, preferentially a material similar to that of the slides 27 and/or of the guides 41.

According to an embodiment, the upstream and/or downstream ends of the slides 27 have a chamfered and/or pointed configuration similar to the guides 41 and/or the slides 27.

In one case as in the other, according to an embodiment, said interlocking comprises a transverse play 7 ensuring the free vibratory movement of the guides 41 in said horizontal or substantially horizontal plane. In sum, the width of the gap 28 of the slides 27 or else the width of the recesses 60 of the plate 6, is determined to ensure a displacement of the ends of the guides 41 which are positioned therein.

Preferentially, the play is determined such that, in their vibratory movement, the guides 41 do not come into contact with the slides 27. This play notably takes account of the amplitude of the travel of the guides 41.

Preferentially, the conveying installation 2 can comprise a vibratory device 4 reprising the characteristics of the abovementioned embodiments.

Thus, the conveying installation 2, equipped with the vibratory device 4 according to the invention, makes it possible to transmit vibrations to the products, via the belt 21, in order to avoid any blockage of the products 1 between them or against fixed elements, most particularly between the sheets 290 of an aligner 29 or else between the parallel sheets 290 of corridor-creating means, notably at the upstream end of said sheets 290.

This vibration performed from below reduces the quantity of vibrations absorbed by the support structure 20 and uniformly increases the transmission of the vibrations to the products 1. Furthermore, the invention makes it possible to reduce the power of the motorization required to transmit the vibratory movement, overcoming a part of vibrations dissipated to other components of the installation 2, which limits the losses to the support structure 20 and reduces the risk of breakage. Moreover, this configuration of controlled transmission of vibrations from the bottom makes it possible to apply a manual adjustment but preferentially an automatic adjustment of the other components of the installation 2, notably when changing the format of products 1 to be treated, without the vibrations disrupting such an adjustment.

The invention therefore relates to a vibratory device which makes it possible to ensure different functions, and in particular that of improving the passage of a loose flow of unitary products to a multiple-line flow, that is to say made up of several columns separated from one another, by avoiding the blockages in the alignment corridors. In the context of the invention, since the products 1 circulate on their bottom, at significant speeds, the vibrations induced must be sufficient for these products 1 not to remain jammed at the input of the corridors, but not too great, at risk of making them drop. In the context of the invention, the vibrations are transmitted from below the products 1, in order to optimize their effect: the vibrations are transmitted uniformly to said products while the quantity of vibrations absorbed by the support structure 20 is reduced.

The fact that the guides 41 are fixed onto a movable frame is particularly advantageous: it is then possible to ensure the transmission of the vibratory movement to all the guides 41 simultaneously, or in a synchronized manner.

Furthermore, this configuration makes it possible to further reduce the vibrations transmitted to the support structure 20 via at least one articulation which links the frame, which is movable, to the chassis of the vibratory device 4, which is fixed.

The invention claimed is:

1. A vibratory support device for an installation for conveying products, comprising:
   a fixed chassis;
   guides mounted on the chassis that are parallel to one another and oriented in a longitudinal direction, the guides being configured as sliding supports of an endless-type belt of a conveying installation,
   the guides being mounted to be movable with respect to the chassis by a vibratory movement in a horizontal or essentially horizontal plane;
   a movable frame for supporting attachment of the guides thereto, the movable frame linked to the chassis by engagement of at least one articulation therebetween; and
   at least one actuator for providing vibratory movement to the movable frame.

2. The vibratory device as claimed in claim 1, wherein the at least one actuator is embedded on the frame.

3. The vibratory device as claimed in claim 1, wherein the at least one articulation is elastic, forming means for absorbing the vibratory movement between the frame and the chassis.

4. The vibratory device as claimed in claim 1, comprising at least one end upstream of each of the guides comprising a chamfered, dished, top face.

5. The vibratory device as claimed in claim 1, comprising at least one end upstream of each of the guides with lateral edges that diverge from the outside to the inside of the corresponding guide.

6. An installation for conveying products in a longitudinal direction, comprising:
   a support structure;
   slides that are fixedly mounted on the support structure parallel to one another and oriented in the longitudinal direction;

the slides being separated transversely by a gap;

at least one endless-type conveying belt, the belt being supported by the surface of the slides along at least a portion (3) of the length of the conveying installation; and a motorization of the conveying belt in the longitudinal direction from upstream to downstream comprising along another contiguous portion, a vibratory device wherein the vibratory device comprises:

a fixed chassis mounted on the support structure;

guides mounted on a frame that are parallel to one another and oriented in the longitudinal direction, the guides extending in continuity with the slides, acting as supports for the conveying belt; and the guides (41) being mounted to be movable with respect to the chassis, via the frame that is provided to be movable with respect to the chassis by a vibratory movement in a horizontal or essentially horizontal plane.

7. The conveying installation as claimed in claim 6, wherein the upstream and/or downstream ends of the guides are positioned interlocking respectively with the downstream and/or upstream ends of the slides, inside the gaps between the slides.

8. The conveying installation as claimed in claim 6, comprising:

at least one joining plate flush between the slides and the guides; and the upstream and/or downstream ends of the guides being positioned interlocking in corresponding recesses of the plate.

9. The conveying installation as claimed in claim 8, wherein the interlocking comprises a transverse play ensuring the free vibratory movement of the guides in the horizontal or substantially horizontal plane.

10. The conveying installation as claimed in claim 6, wherein the vibratory device comprises at least one actuator of the frame by the vibratory movement.

11. The conveying installation as claimed in claim 6, wherein the vibratory device comprises at least one elastic articulation, forming means for absorbing the vibratory movement between the frame and the chassis.

12. The conveying installation as claimed in claim 10, wherein the at least one actuator is motorized:
   wherein the actuator is embedded on the frame; or
   by the motorization via a transmission.

13. The conveying installation as claimed in claim 6, wherein the vibratory device comprises means for setting the height between the chassis and the frame.

14. The conveying installation as claimed in claim 6, comprising above the belt, an aligner of the products, the aligner extending at least along the other portion.

* * * * *